(12) United States Patent
Gyota

(10) Patent No.: US 10,895,394 B2
(45) Date of Patent: Jan. 19, 2021

(54) AIR CONDITIONING VISUALIZATION SYSTEM

(71) Applicant: Mitsubishi Electric Corporation, Tokyo (JP)

(72) Inventor: Tomoaki Gyota, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 28 days.

(21) Appl. No.: 16/081,625

(22) PCT Filed: May 11, 2016

(86) PCT No.: PCT/JP2016/063965
§ 371 (c)(1),
(2) Date: Aug. 31, 2018

(87) PCT Pub. No.: WO2017/195286
PCT Pub. Date: Nov. 16, 2017

(65) Prior Publication Data
US 2019/0120517 A1    Apr. 25, 2019

(51) Int. Cl.
*F24F 11/49* (2018.01)
*F24F 11/52* (2018.01)
(Continued)

(52) U.S. Cl.
CPC .............. *F24F 11/49* (2018.01); *F24F 11/52* (2018.01); *F24F 11/54* (2018.01); *F24F 11/56* (2018.01); *F24F 11/58* (2018.01); *F24F 11/64* (2018.01); *F24F 11/65* (2018.01); *F24F 11/89* (2018.01); *G05B 15/02* (2013.01); *G05B 19/042* (2013.01); *F24F 2110/10* (2018.01); *F24F 2120/10* (2018.01); *F24F 2120/12* (2018.01); *F24F 2120/20* (2018.01); *F24F 2140/00* (2018.01);
(Continued)

(58) Field of Classification Search
CPC .. F24F 11/49; F24F 11/52; F24F 11/54; F24F 11/58; F24F 11/65; F24F 11/89
See application file for complete search history.

(56) References Cited

U.S. PATENT DOCUMENTS

2015/0061841 A1*  3/2015  Lee .................. G08C 17/02
340/12.5

FOREIGN PATENT DOCUMENTS

EP    2 982 911 A1    2/2016
EP    3 104 091 A1    12/2016
(Continued)

OTHER PUBLICATIONS

Extended EP Search Report dated Apr. 2, 2019 issued in corresponding EP patent application No. 16901634.2.
(Continued)

*Primary Examiner* — Ruiping Li
(74) *Attorney, Agent, or Firm* — Posz Law Group, PLC

(57) ABSTRACT

Provided is an air conditioning visualization system including an image capturing unit to capture an image, an air conditioner setting acquisition unit to specify at least one air conditioner exerting an influence on a space included in the captured image from a plurality of air conditioners and to acquire the operation setting of this at least one air conditioner, and a display unit to display a visualization image obtained by visualizing the influence exerted on the space by this at least one air conditioner.

10 Claims, 11 Drawing Sheets

(51) Int. Cl.
  *F24F 11/56* (2018.01)
  *G05B 15/02* (2006.01)
  *F24F 11/64* (2018.01)
  *F24F 11/65* (2018.01)
  *F24F 11/89* (2018.01)
  *F24F 11/54* (2018.01)
  *F24F 11/58* (2018.01)
  *G05B 19/042* (2006.01)
  *F24F 120/12* (2018.01)
  *F24F 120/10* (2018.01)
  *F24F 120/20* (2018.01)
  *F24F 140/00* (2018.01)
  *F24F 110/10* (2018.01)

(52) U.S. Cl.
  CPC .. *F24F 2221/38* (2013.01); *G05B 2219/2614* (2013.01)

(56) References Cited

FOREIGN PATENT DOCUMENTS

| JP | 2011-257071 A | 12/2011 |
| JP | 2012-172910 A | 9/2012 |
| JP | 2014-190686 A | 10/2014 |
| JP | 2014-202366 A | 10/2014 |

OTHER PUBLICATIONS

International Search Report of the International Searching Authority dated Aug. 9, 2016 for the corresponding international application No. PCT/JP2016/063965 (and English translation).
Office Action dated Feb. 6, 2020 issued in corresponding CN patent application No. 201680085416.5 (and English translation).
Office Action dated Jul. 28, 2020 issued in corresponding EP patent application No. 16901634.2.
Office Action dated Aug. 17, 2020 issued in corresponding CN patent application No. 201680085416.5 (and English translation).

\* cited by examiner

AIR CONDITIONING VISUALIZATION SYSTEM

CROSS REFERENCE TO RELATED APPLICATION

This application is a U.S. national stage application of International Patent Application No. PCT/JP2016/063965 filed on May 11, 2016, the disclosure of which is incorporated herein by reference.

TECHNICAL FIELD

The present invention relates to an air conditioning visualization system and, more particularly, to an air conditioning visualization system which visualizes air conditioning in a space desired by a user.

BACKGROUND ART

Since it is impossible to see and check room temperature and airflows controlled by an air conditioner, a user cannot check whether the current settings provides the environment that the user desires.

To this situation, in an air conditioning unit described in patent reference 1, an image of an air conditioner is captured by using a camera, operation settings such as an air direction, an air velocity or an operation mode set in the air conditioner are combined with the captured image to create a captured image and the combined image is displayed on a display unit. This allows the visualization of the operation settings on a screen image displayed on the display unit.

PATENT REFERENCE

Patent Reference 1: Japanese Patent Application Publication No. 2014-190686

However, the air conditioning unit described in patent reference 1 is designed for a domestic air conditioner without the consideration of a case that there are a plurality of air conditioners.

In an air conditioning system for office buildings in which a plurality of air conditioners are disposed, it is necessary to identify which air conditioner is present in the captured image.

Further, in an air conditioning system for office buildings in which a plurality of air conditioners are disposed, airflows are complicated by the wind blowing from adjacent air conditioners. To visualize such airflows, using an image including a plurality of indoor units are effective, but it is difficult for the technique described in the patent reference 1 to reflect the operation settings of each air conditioner.

SUMMARY

In view of this, the present invention aims to check the influence of an air conditioner in a space included within an image capturing range, even in a case of the presence of a plurality of air conditioners.

An air conditioning visualization system according to one aspect of the present invention includes an image capturing unit to capture an image, an air conditioner setting acquisition unit to specify at least one air conditioner exerting an influence on a space included in the image from a plurality of air conditioners and to acquire an operation settings of the at least one air conditioner, and a display unit to display a visualization image obtained by visualizing the influence exerted on the space by the at least one air conditioner.

According to one aspect of the present invention, even in a case of the presence of a plurality of air conditioners, as an air conditioner exerting influence in a space included within an image capturing range can be specified, the influence of the air conditioner in the space can be checked.

DETAILED DESCRIPTION

Embodiment 1

Figure 1:
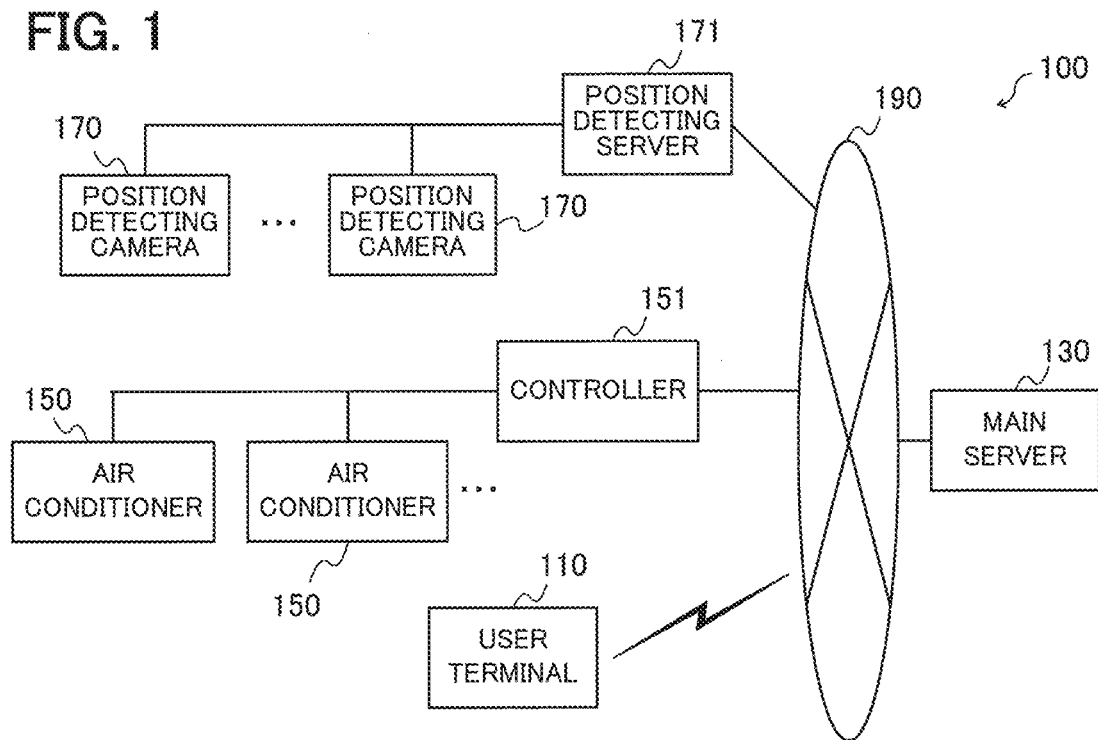
FIG. 1 is a block diagram schematically illustrating a configuration of an air conditioning visualization system according to Embodiment 1.

FIG. 1 is a block diagram schematically illustrating a configuration of an air conditioning visualization system 100 according to Embodiment 1.

The air conditioning visualization system 100 includes a user terminal 110 and a main server 130, as illustrated in FIG. 1.

An air conditioning system, which is a target of visualization, includes a plurality of air conditioners 150 and a controller 151, which are connected to each other via a network.

An indoor position detecting system, which detects the position of the user terminal 110, includes position detecting cameras 170 and a position detecting server 171, which are connected to each other via a network.

The user terminal 110, the main server 130, the controller 151, and the position detecting server 171 are connected to each other via a network 190.

Figure 2:
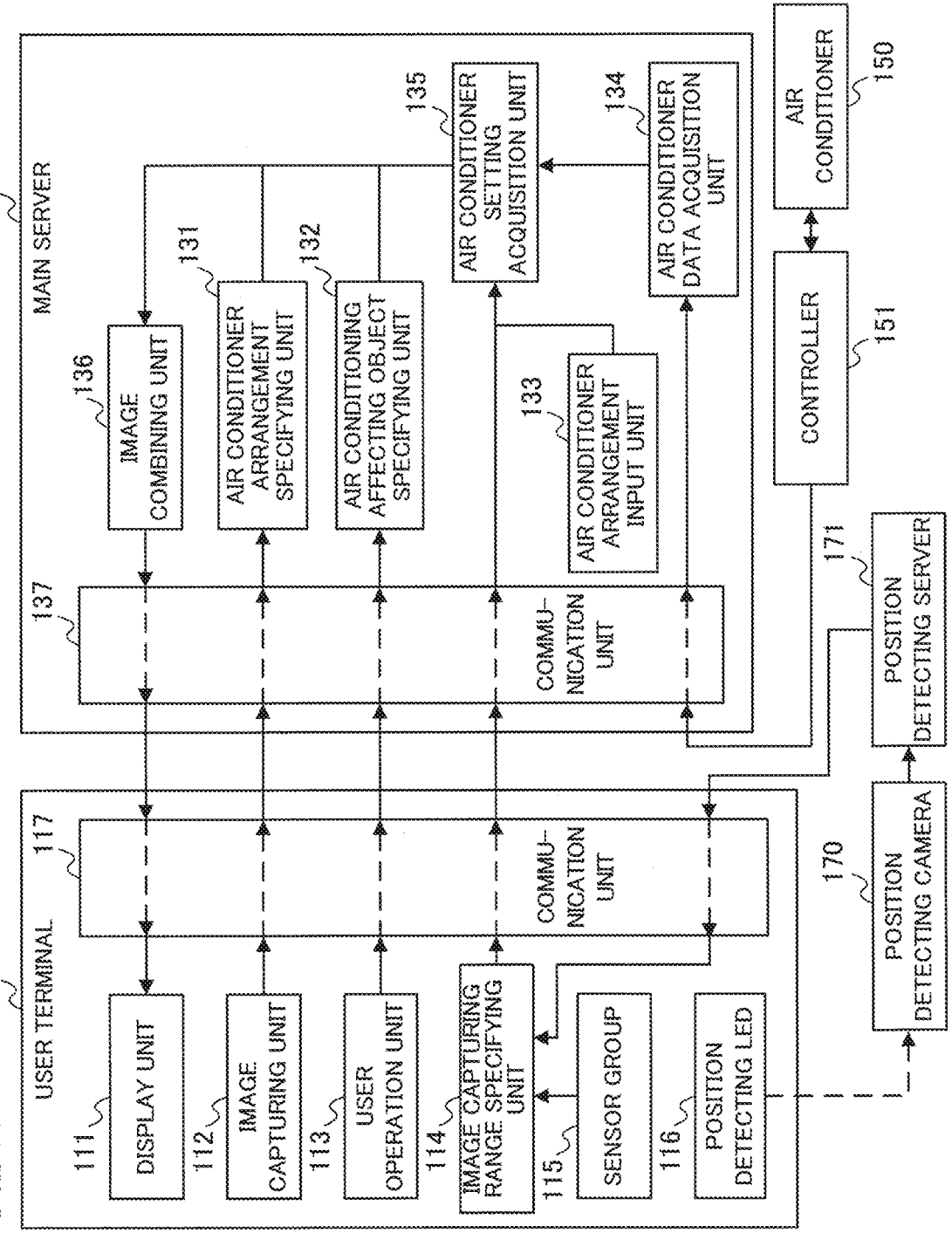
FIG. 2 is a block diagram schematically illustrating configurations of a user terminal and a main server in Embodiment 1.

FIG. 2 is a block diagram schematically illustrating configurations of the user terminal 110 and the main server 130.

The user terminal 110 includes a display unit 111, an image capturing unit 112, a user operation unit 113, an image capturing range specifying unit 114, a sensor group 115, a position detecting LED 116, and a communication unit 117, as illustrated in FIG. 2.

The display unit 111 displays various images. For example, the display unit 111 displays a visualization image representing a visualization result. In the visualization image, influence on a space by an air conditioner 150, which influences the space included in an image captured by the image capturing unit 112, is visualized. The influence on the space can be indicated by at least one of, for example, diagram, color, and change of brightness.

The image capturing unit 112 captures an image. More specifically, the image capturing unit 112 captures an image of a target and generates image data of the image. In this case, the image capturing unit 112 captures an image of a space that is a visualization target and generates image data of the captured image.

The user operation unit 113 receives input of an operation from the user. For example, the user operation unit 113 receives input of information that the user gives to the captured image.

The image capturing range specifying unit 114 specifies an image capturing range for an image that is captured according to values obtained by the sensor group 115 and terminal position information acquired from the position detecting server 171.

The sensor group 115 includes various sensors used in the user terminal 110. In Embodiment 1, the sensor group 115 includes, for example, an acceleration sensor and a geomagnetic sensor.

The position detecting LED 116 serves as an indicator for detecting the position of the user terminal 110 by the indoor position detecting system.

The communication unit 117 serves as an interface which performs communication via the network 190.

Figure 3:
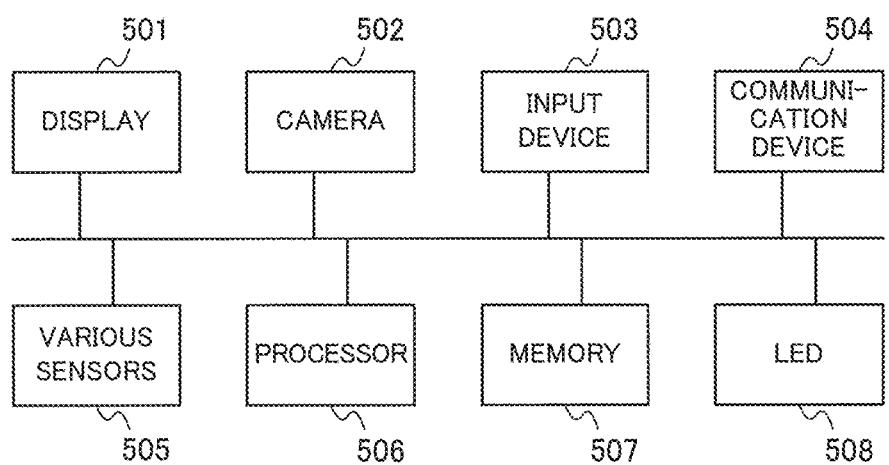
FIG. 3 is a schematic diagram illustrating an example of a hardware configuration of the user terminal in Embodiment 1.

FIG. 3 is a schematic diagram illustrating an example of a hardware configuration of the user terminal 110.

The user terminal 110 includes a display 501, a camera 502, an input device 503, a communication device 504 such as a Network Interface Card (NIC), various sensors 505, a processor 506 such as a Central Processing Unit (CPU), a memory 507, and an LED 508, as illustrated in FIG. 3.

The display unit 111 can be implemented by the display 501 controlled by the processor 506. The image capturing unit 112 can be implemented by the camera 502 controlled by the processor 506. The user operation unit 113 can be implemented by the input device 503 controlled by the processor 506. The image capturing range specifying unit 114 can be implemented by the processor 506 executing a program stored in the memory 507. The sensor group 115 can be implemented by the various sensors 505 controlled by the processor 506. The position detecting LED 116 can be implemented by the LED 508 controlled by the processor 506. The communication unit 117 can be implemented by the communication device 504 controlled by the processor 506.

The display unit 111 and the user operation unit 113 may be implemented by a touch panel, which integrates the display 501 and the input device 503, controlled by the processor 506.

The main server 130 includes an air conditioner arrangement specifying unit 131, an air conditioning affecting object specifying unit 132, an air conditioner arrangement input unit 133, an air conditioner data acquisition unit 134, an air conditioner setting acquisition unit 135, an image combining unit 136, and a communication unit 137, as illustrated in FIG. 2.

The air conditioner arrangement specifying unit 131 specifies an outlet of an air conditioner 150 in the image obtained by the image capturing unit 112 of the user terminal 110. In this case, the air conditioner arrangement specifying unit 131 specifies the position and orientation of the outlet of the air conditioner 150 in the image obtained by the image capturing unit 112 of the user terminal 110.

The air conditioning affecting object specifying unit 132 receives air conditioning affecting object information, which represents an air conditioning affecting object such as a partition or a PC, from the user operation unit 113 of the user terminal 110, and specifies the position of the air conditioning affecting object affecting air conditioning by the air conditioner 150, based on the received information.

The air conditioner arrangement input unit 133 receives input of drawing information as air conditioner arrangement information indicating positions where the air conditioners 150 are disposed. For example, of the drawing information is information obtained by associating an appliance ID for specifying an air conditioner 150 with the position (for example, the X- and Y-coordinates) of the air conditioner 150 specified by the appliance ID is placed in a room. The input drawing information is stored in a storage unit not shown.

The air conditioner data acquisition unit 134 acquires operation settings of the air conditioner 150 having the specified appliance ID via the controller 151. Examples of the operation settings include ON/OFF, the air direction, the air volume, and the operation mode.

The air conditioner setting acquisition unit 135 specifies one or more air conditioners 150 exerting an influence on a space included in the image captured by the image capturing unit 112 from the plurality of air conditioners 150 and acquires the operation settings of the one or more air conditioners 150. For example, the air conditioner setting acquisition unit 135 specifies the appliance ID of an air conditioner 150 in the image captured by the user terminal 110, based on an image capturing range indicated by the image capturing range information obtained by the image capturing range specifying unit 114 of the user terminal 110, and an arrangement indicated by the drawing information obtained by the air conditioner arrangement input unit 133. The air conditioner setting acquisition unit 135 instructs the air conditioner data acquisition unit 134 to acquire the operation settings of the air conditioner 150 corresponding to the specified appliance ID. In this case, the air conditioner 150 exerting an influence on the space included in the image captured by the image capturing unit 112 is the air conditioner 150 included in the image captured by the image capturing unit 112.

The image combining unit 136 generates combined image data representing a visualization image to be displayed on the display unit 111 of the user terminal 110 by combining an image representing the airflow analysis result with the image captured by the user terminal 110. In this case, the influence on the space included in the image captured by the user terminal 110 is airflows from the air conditioner 150. More specifically, the image combining unit 136 generates combined image data of a visualization image by combining an image virtually representing the influence (airflows) that the air conditioner 150 exerts on the space included in the image captured by the user terminal 110 onto this image.

The communication unit 137 serves as an interface which performs communication via the network 190. For example, the communication unit 137 transmits the combined image data generated by the image combining unit 136 to the user terminal 110.

Figure 4:
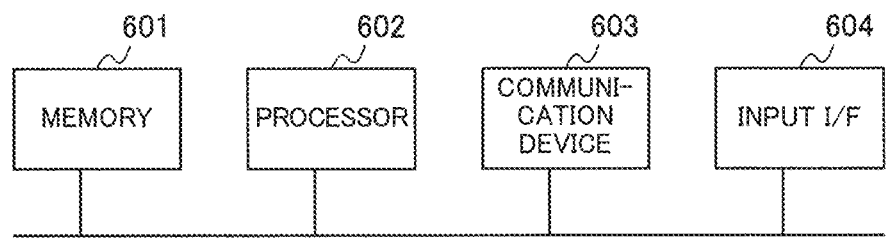
FIG. 4 is a schematic diagram illustrating an example of a hardware configuration of the main server in Embodiment 1.

FIG. 4 is a schematic diagram illustrating an example of a hardware configuration of the main server 130.

The main server 130 includes a memory 601, a processor 602, a communication device 603, and an input interface (to be referred to as an "input I/F" hereinafter) 604, as illustrated in FIG. 4.

The air conditioner arrangement specifying unit 131, the air conditioning affecting object specifying unit 132, the air conditioner data acquisition unit 134, the air conditioner setting acquisition unit 135, and the image combining unit 136 can be implemented by the processor 602 executing a program stored in the memory 601. The communication unit 137 can be implemented by the communication device 603 controlled by the processor 602. The air conditioner arrangement input unit 133 can be implemented by the input I/F 604 controlled by the processor 602. The air conditioner arrangement input unit 133 may be implemented not by the input I/F 604 but by the communication device 603 controlled by the processor 602, or the air conditioner arrangement input unit 133 may be implemented by an input device such as a keyboard controlled by the processor 602. The storage unit not shown can be implemented by the memory 601 controlled by the processor 602.

As for the position detecting camera 170 illustrated in FIG. 2, a plurality of position detecting cameras 170 are arranged in a target space to be detected.

The position detecting server 171 detects the position detecting LED 116 of the user terminal 110 by image processing, based on an image from the position detecting camera 170. The position detecting server 171 thus generates position information indicating the position of the user terminal 110.

For example, the position detecting LED 116 emits light in a light emission pattern which is different for each specific terminal. The position detecting server 171 identifies the light emission pattern from the image obtained by the position detecting camera 170 to specify the position of the user terminal 110, based on camera position information registered in advance.

A system using a camera will be described as an example of the indoor position detecting system in Embodiment 1. However, the indoor position detecting system is not limited to such an example and may be implemented as a system which estimates a position from the radio wave strength, the radio arrival time, or the number of communicable base stations by setting wireless base stations, or a system which estimates the position of the user terminal 110 by matching with the position of an illumination device, a column, or a window stored in advance by using the image captured by the user terminal 110.

The operation of the air conditioning visualization system 100 according to Embodiment 1 will be described below with reference to FIG. 5.

The indoor position detecting system always performs an operation for detecting the position of the user terminal 110.

Figure 5:
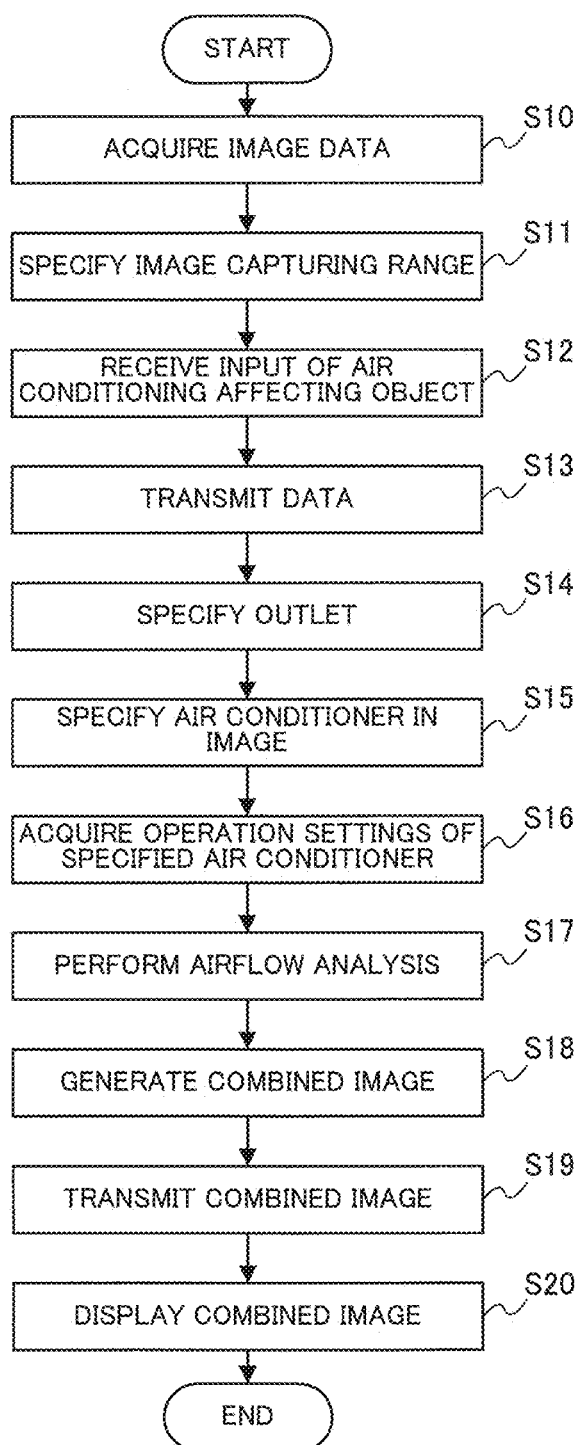
FIG. 5 is a flowchart illustrating the operation of the air conditioning visualization system according to Embodiment 1.

FIG. 5 is a flowchart illustrating the operation of the air conditioning visualization system 100 according to Embodiment 1.

First, in response to an image capturing operation from the user, the image capturing unit 112 of the user terminal 110 acquires image data by operating a camera module mounted on the user terminal 110 (S10).

The image capturing range specifying unit 114 of the user terminal 110 acquires, from the position detecting server 171 via the communication unit 117, terminal position information indicating the position of the user terminal 110 at the time when the image data is acquired. The image capturing range specifying unit 114 further acquires, from the sensor group 115, values obtained by the acceleration sensor and the geomagnetic sensor at the time when the image data is acquired. The image capturing range specifying unit 114 estimates a vertical image capturing direction based on the value from the acceleration sensor and a horizontal image capturing direction based on the value from the geomagnetic sensor. The image capturing range specifying unit 114 associates, with the image data, image capturing range information which is generated by combining these image capturing directions with the terminal position information, and stores the generated information in the storage unit not shown (S11).

The display unit 111 of the user terminal 110 displays the captured image and an interface which allows the user to input the position of an air conditioning affecting object, for example, a shield such as a partition or a heat source such as a PC, in the image. In response to an input completion operation from the user, the user operation unit 113 associates the input information as air conditioning affecting object information with the image data, and stores the input information in the storage unit not shown (S12). For example, with the interface, the user operation unit 113 analyzes the captured image to extract and present candidates for a heat source or a shield to the user. The user selects an air conditioning affecting object from the extracted candidates and designates the type of air conditioning affecting object (for example, a heat source or a shield). The user operation unit 113 can also specify the depth direction position of the selected air conditioning affecting object by pattern matching with an image of any object likely to be situated in an office. The user operation unit 113 generates air conditioning affecting object information indicating the type of air conditioning affecting object and the position of the air conditioning affecting object.

The communication unit 117 of the user terminal 110 transmits the image data of the captured image, the image capturing range information, and the air conditioning affecting object information to the main server 130 (S13).

The air conditioning affecting object specifying unit 132 of the main server 130 stores just the received air conditioning affecting object information in the storage unit not shown. In Embodiment 1, air conditioning affecting object information is input from the user terminal 110 and used as it is, but it may be automatically specified by pattern matching or the like based on the image data by the air conditioning affecting object specifying unit 132.

The air conditioner arrangement specifying unit 131 of the main server 130 specifies the position and orientation of an outlet in the image, based on the acquired image data (S14). More specifically, the air conditioner arrangement specifying unit 131 specifies the position and orientation of the outlet by pattern matching with an appearance image of the air conditioner 150.

The air conditioner setting acquisition unit 135 of the main server 130 specifies the appliance ID of an air conditioner 150 in the image represented by the image data, based on the image capturing range information and the drawing information acquired from the air conditioner arrangement input unit 133 (S15). For example, the air conditioner setting acquisition unit 135 specifies the appliance ID of an air conditioner 150 included in the image represented by the image data from the user terminal 110, based on the position of the user terminal 110 indicated by the image capturing range information, and the vertical and horizontal image capturing directions. The angle of view of the image represented by the image data can be estimated by using an assumption that the surface on which the air conditioner 150 (quadrangular) is present is planar. The angle of view may be included as metadata of the image data.

The air conditioner setting acquisition unit 135 of the main server 130 acquires operation settings (for example, ON/OFF, the air direction, the air volume, and the operation mode) of the air conditioner 150 corresponding to the specified appliance ID via the air conditioner data acquisition unit 134 (S16).

The image combining unit 136 of the main server 130 performs airflow analysis in consideration of interference between air blows and bending by a shield, based on the specified position and orientation of the outlet, the acquired air direction and volume of the air conditioner 150, and the position of the air conditioning affecting object transmitted from the user terminal 110 and stored (S17).

In this case, the image combining unit 136 specifies the arrangement of the air conditioner 150 and the air conditioning affecting object in the room, based on the drawing information and the air conditioning affecting object information, and conducts a known simulation by using the operation settings of the air conditioner 150, and the position and orientation of the outlet to specify an airstream from the outlet of the air conditioner 150.

The image combining unit 136 of the main server 130 generates combined image data (visualization image data) of a combined image (visualization image) obtained by superimposing the airflow analysis result on the image represented by the image data (S18).

For example, the image combining unit 136 generates a two-dimensional image in which the result (three-dimensional) of the above-mentioned simulation corresponds to the angle of view estimated from the position and orientation of the user terminal 110 specified by the image capturing range information, and from the image represented by the image data from the user terminal 110. The image combining unit 136 generates the combined image data by superimposing the thus generated virtual image on the image represented by the image data from the user terminal 110.

In Embodiment 1, the airflow analysis result is superimposed on the image data, but the image combining unit 136 may superimpose the airflow analysis result on a mock image of the position of the air conditioner 150, the position of the outlet, the air conditioning affecting object and the like.

The communication unit 137 of the main server 130 transmits the generated combined image data to the user terminal 110 (S19).

In the user terminal 110, the communication unit 117 receives the combined image data and a combined image based on the combined image data is displayed on the display unit 111 (S20).

Figure 6:
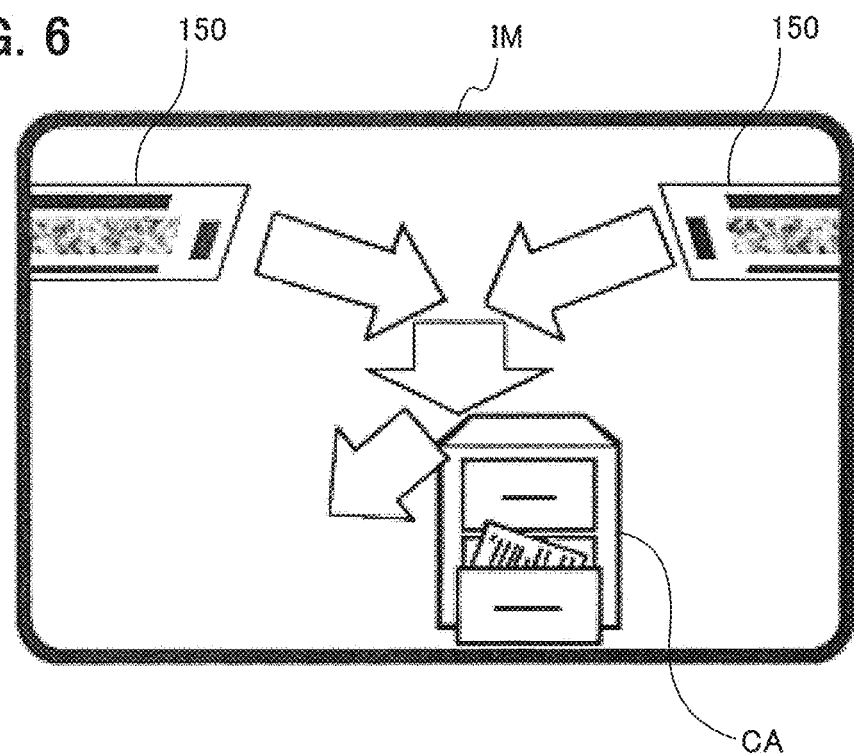
FIG. 6 is a schematic diagram illustrating an example of a combined image displayed on the user terminal.

FIG. 6 is a schematic diagram illustrating an example of a combined image displayed on the user terminal 110.

A combined image IM includes air conditioners 150, a cabinet CA as an air conditioning affecting object, and airstreams from the air conditioners 150 are indicated by arrows, as illustrated in FIG. 6. The airstream from one of the air conditioners 150 hits the airstream from the opposed air conditioner 150, flows downwards, then hits the cabinet CA, and thus changes its course, as illustrated in FIG. 6.

With the air conditioning visualization system 100 configured as described above, a user (resident) who is dissatisfied with the air conditioning environment (especially the exposure to the wind, or the like) can check airflows simply by capturing an image of the space in question with the image capturing unit 112 mounted on the user terminal 110. The user can set a desired air conditioning environment by changing the setting with the controller 151.

The air conditioning visualization system 100 performs visualization in consideration of interference between airstreams from a plurality of outlets and airflow turbulence caused by a shield. In other words, airstreams from the plurality of outlets are combined with each other. Hence, the user can check airflows that cannot be guessed only from the visually-observable orientation of the outlet. In addition, it is possible to perform visualization reflecting the details of the operation settings of an air conditioner 150 included in an automatically captured range without the user inputting the operation state of the air conditioner 150.

In Embodiment 1, the air conditioner arrangement specifying unit 131 specifies an outlet from the image represented by the image data, but the processing of the air conditioner arrangement specifying unit 131 is not limited to such an example. For example, the air conditioner arrangement specifying unit 131 may estimate the position of an outlet, based on the image capturing range information and the drawing information acquired from the air conditioner arrangement input unit 133. With this operation, even when no air conditioner 150 is included in the image, airflows from neighboring air conditioners 150 can be visualized. In this case, the orientation of the outlet may be set to a predetermined orientation or estimated based on the operation settings acquired by the air conditioner setting acquisition unit 135.

In Embodiment 1, the air conditioner arrangement specifying unit 131 specifies an outlet by pattern matching between an air conditioner appearance image held in advance and the image represented by the image data, but the processing of the air conditioner arrangement specifying unit 131 is not limited to such an example. For example, the air conditioner arrangement specifying unit 131 may specify, as an outlet, a portion changed in the image represented by the image data which is acquired when the air conditioner arrangement specifying unit 131 use the appliance ID specified by the air conditioner setting acquisition unit 135 to change the air direction setting of the air conditioner 150 corresponding to this appliance ID. This can improve the accuracy of pattern matching.

A plurality of LEDs may be arranged in the air conditioner 150 and the air conditioner arrangement specifying unit 131 may specify an outlet from the LED arrangement in the image. This can improve the accuracy of pattern matching. When, for example, the air conditioner 150 serves as an indoor unit equipped with outlets facing the four directions, the outlets can be accurately specified by diagonally arranging LEDs.

The air conditioner appearance image used in pattern matching may be changed in accordance with model information acquired based on the appliance ID specified by the air conditioner setting acquisition unit 135. This can improve the accuracy of pattern matching.

In Embodiment 1, the image combining unit 136 performs airflow analysis, but, in addition to or instead of the airflow analysis, it may analyze the temperature distribution on the periphery of an air conditioner based on the information of the intake temperature or the set temperature and perform visualization by, for example, coloring a combined image. This can visualize the unevenness of temperature in the target space.

In Embodiment 1, the analysis result is combined with the captured image and displayed, but the operation setting may be changed by operating the user terminal 110. When the display unit 111 and the user operation unit 113 of the user terminal 110 are, for example, implemented by a touch panel, if the airflow in the displayed combined image on the touch panel is moved, the user operation unit 113 to generate a command corresponding to such an operation. The user operation unit 113 transmits the generated command to the controller 151 via the communication unit 117 or via the main server 130, so that the user can change easily the setting with a feeling of directly operating the airflow.

In Embodiment 1, analysis and image combining are performed for the entire captured image, but the user may designate a priority analysis portion to be analyzed by operating the user terminal 110, analysis of an airflow associated with the designated portion only may be made, and the analysis result may be displayed in highlighted form. This can visualize information desired by the user with less calculation. The user may input a request (such as "feel hot," "feel cold," or "want to shelter from the wind") regarding the designated portion to the user operation unit 113, thereby the controller 151 automatically may retrieve and execute a setting satisfying the request from a combination of the operation settings of the air conditioners 150 in the image. This can easily make an air conditioning setting complying with the user request.

Embodiment 2

Figure 7:
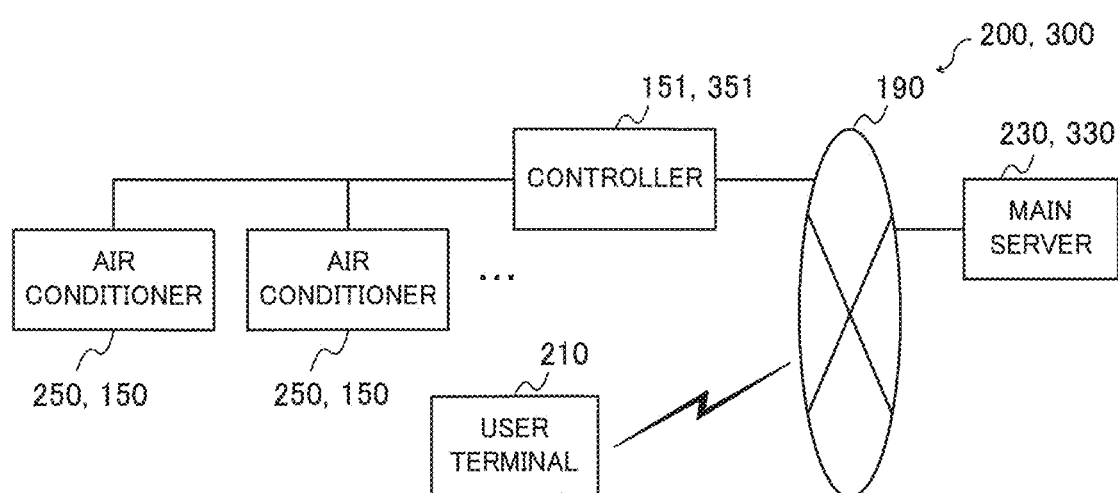
FIG. 7 is a block diagram schematically illustrating a configuration of an air conditioning visualization system according to Embodiment 2 or 3.

FIG. 7 is a block diagram schematically illustrating a configuration of an air conditioning visualization system 200 according to Embodiment 2.

The air conditioning visualization system 200 includes a user terminal 210 and a main server 230, as illustrated in FIG. 7.

An air conditioning system, which is a target of visualization, includes air conditioners 250 and a controller 151, which are connected to each other via a network.

The user terminal 210, the main server 230, and the controller 151 are connected to each other via a network 190.

In Embodiment 2, unlike Embodiment 1, no indoor position detecting system is used.

Figure 8:
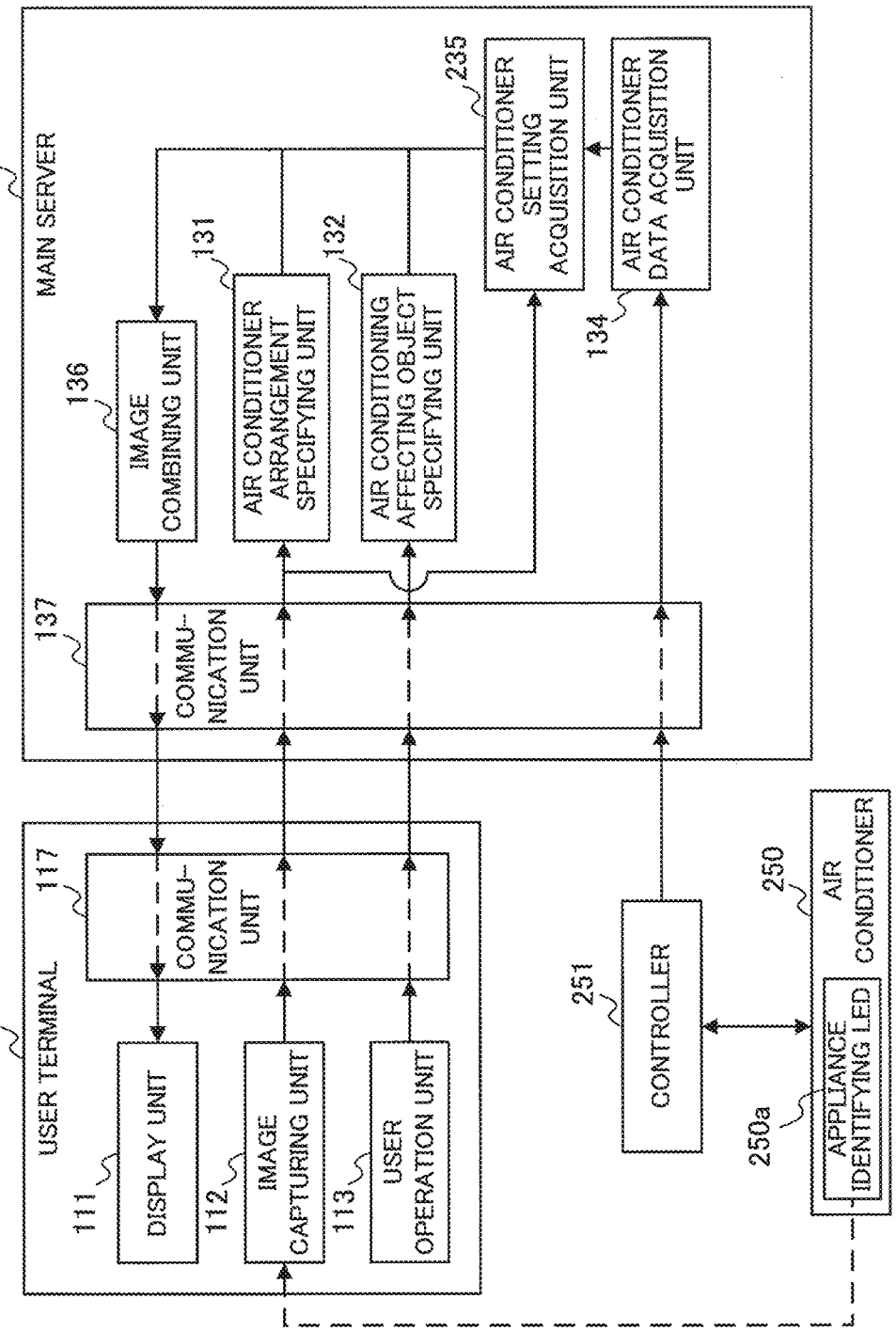
FIG. 8 is a block diagram schematically illustrating configurations of a user terminal and a main server in Embodiment 2.

FIG. 8 is a block diagram schematically illustrating configurations of the user terminal 210 and the main server 230.

The user terminal 210 includes a display unit 111, an image capturing unit 112, a user operation unit 113, and a communication unit 117, as illustrated in FIG. 8. The user terminal 210 in Embodiment 2 does not include an image capturing range specifying unit 114, a sensor group 115, or a position detecting LED 116, unlike the user terminal 110 in Embodiment 1.

In Embodiment 2, unlike Embodiment 1, as illustrated in FIG. 8, the air conditioner 250 includes an appliance identifying LED 250a as an indicator which operates in a light emission pattern different for each appliance ID.

The main server 230 includes an air conditioner arrangement specifying unit 131, an air conditioning affecting object specifying unit 132, an air conditioner data acquisition unit 134, an air conditioner setting acquisition unit 235, an image combining unit 136, and a communication unit 137, as illustrated in FIG. 8.

The main server 230 in Embodiment 2 is configured in the same manner as the main server 130 in Embodiment 1 except including no air conditioner arrangement input unit 133 and processing in the air conditioner setting acquisition unit 235.

The air conditioner setting acquisition unit 235 specifies an appliance ID by identifying the light emission pattern of the appliance identifying LED 250a from an image represented by image data transmitted from the user terminal 210. The air conditioner setting acquisition unit 235 acquires the operation settings of the air conditioner 250 corresponding to the specified appliance ID.

Figure 9:
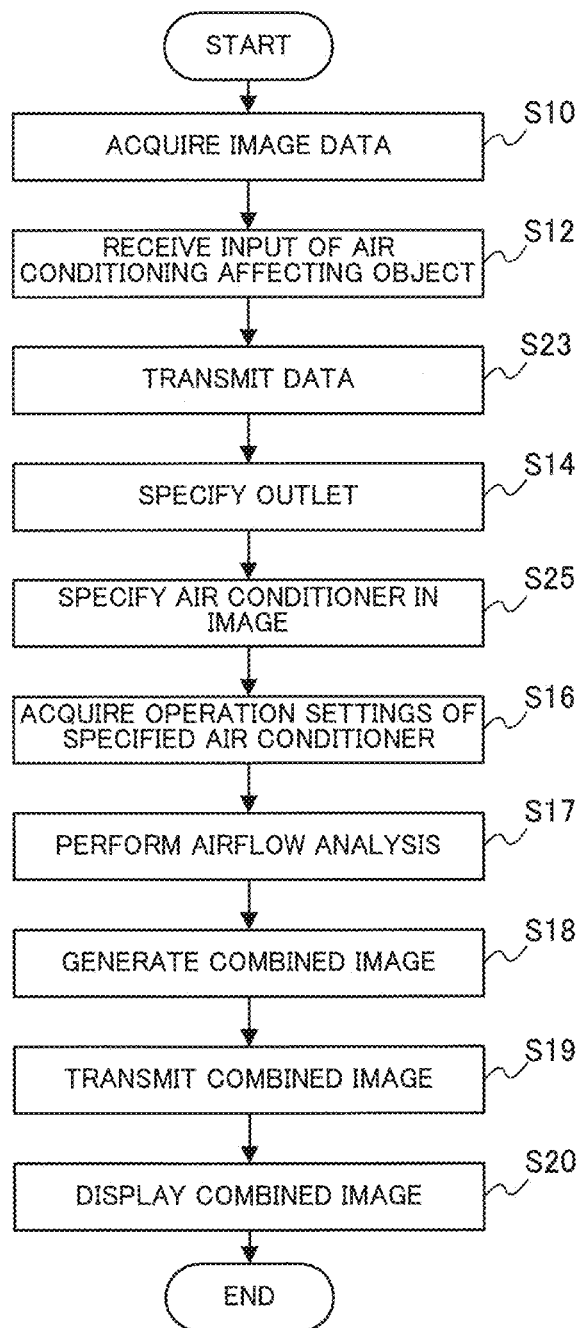
FIG. 9 is a flowchart illustrating the operation of the air conditioning visualization system according to Embodiment 2.

FIG. 9 is a flowchart illustrating the operation of the air conditioning visualization system 200 according to Embodiment 2.

The same reference numerals as in FIG. 5 denote steps for performing the same processes in FIG. 9, and a detailed description thereof will not be given.

The process in step S10 illustrated in FIG. 9 is the same as that in step S10 illustrated in FIG. 5. However, after step S10 illustrated in FIG. 9, the process proceeds to step S12.

The process in step S12 illustrated in FIG. 9 is the same as that in step S12 illustrated in FIG. 5. After step S12 illustrated in FIG. 9, however, the process proceeds to step S23.

In step S23, the communication unit 117 of the user terminal 210 transmits the image data of the captured image and the air conditioning affecting object information to the main server 230. The process then proceeds to step S14.

The process in step S14 illustrated in FIG. 9 is the same as that in step S14 illustrated in FIG. 5. After step S14 illustrated in FIG. 9, however, the process proceeds to step S25.

In step S25, the air conditioner setting acquisition unit 235 specifies an appliance ID by identifying the light emission pattern of the appliance identifying LED 250a from the image represented by the image data transmitted from the user terminal 210. The process then proceeds to step S16.

The processes in steps S16 to S20 of FIG. 9 are the same as those in steps S16 to S20 of FIG. 5.

With the air conditioning visualization system 200 according to Embodiment 2, it is possible to visualize the air conditioning system without presupposing an indoor position detection system and without performing initial settings such as drawing information for each building.

Embodiment 3

An air conditioning visualization system 300 according to Embodiment 3 includes a user terminal 210 and a main server 330, as illustrated in FIG. 7.

An air conditioning system, which is a target of visualization, includes air conditioners 150 and a controller 351, which are connected to each other via a network. The air conditioners 150 in Embodiment 3 are the same as in Embodiment 1. The controller 351 controls the air conditioners 150 in accordance with instructions from the main server 330.

The user terminal 210, the main server 330, and the controller 351 are connected to each other via a network 190.

In Embodiment 3, no indoor position detecting system is used, like Embodiment 2.

Figure 10:
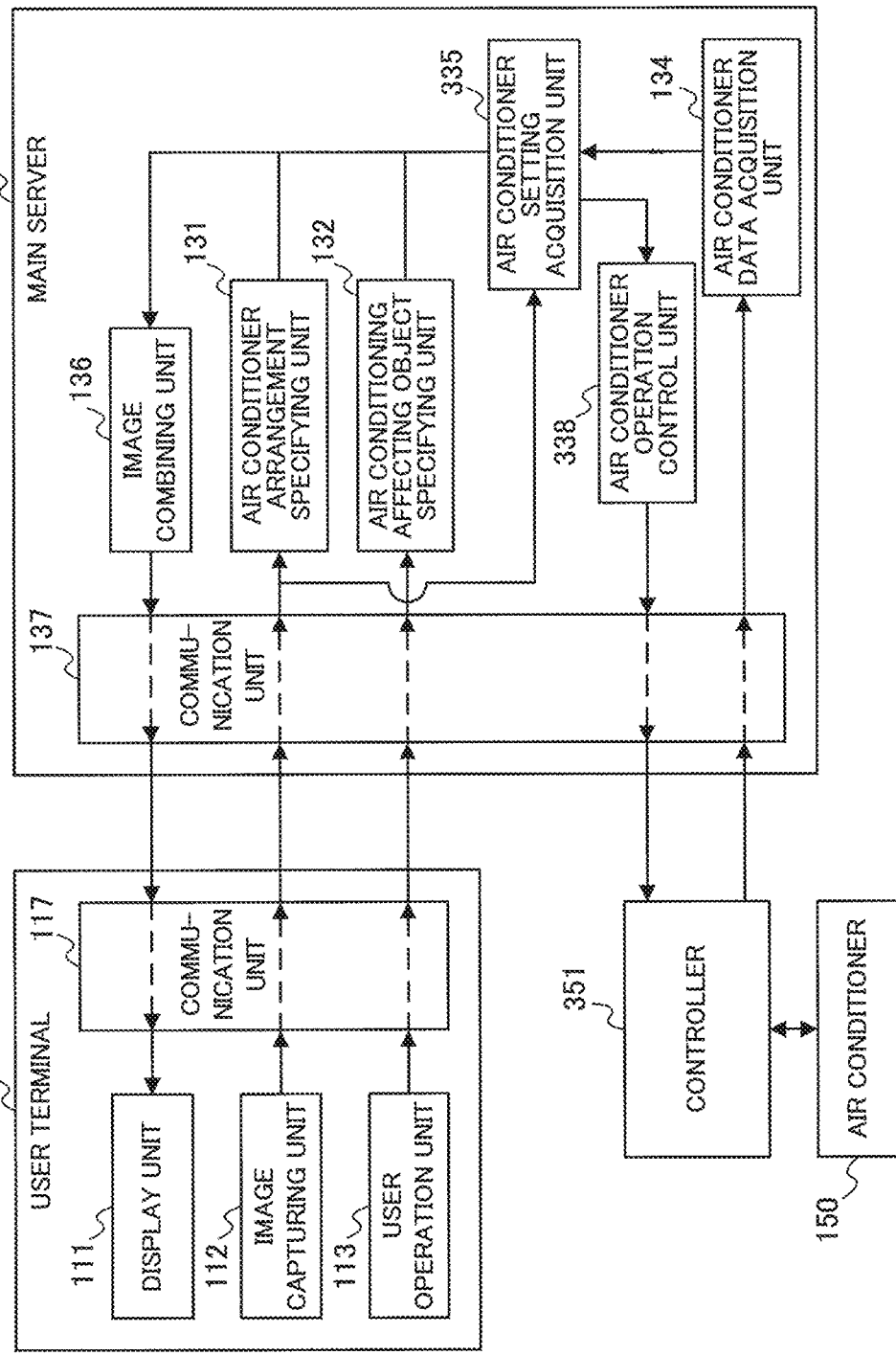
FIG. 10 is a block diagram schematically illustrating configurations of a user terminal and a main server in Embodiment 3.

FIG. 10 is a block diagram schematically illustrating configurations of the user terminal 210 and the main server 330.

The user terminal 210 is configured in the same manner as in Embodiment 2, as illustrated in FIG. 10.

The main server 330 includes an air conditioner arrangement specifying unit 131, an air conditioning affecting object specifying unit 132, an air conditioner arrangement input unit 133, an air conditioner data acquisition unit 134, an air conditioner setting acquisition unit 335, an image combining unit 136, a communication unit 137, and an air conditioner operation control unit 338, as illustrated in FIG. 10.

The main server 330 in Embodiment 3 is configured in the same manner as the main server 230 in Embodiment 2 except further including an air conditioner operation control unit 338 and processing in the air conditioner setting acquisition unit 335.

The air conditioner operation control unit 338 controls the air conditioner 150 in accordance with an instruction from the air conditioner setting acquisition unit 335. For example, the air conditioner operation control unit 338 controls the air conditioner 150 by transmitting an instruction command to the controller 351 via the communication unit 137. In this case, the air conditioner operation control unit 338 sequentially changes the operation settings of the plurality of air conditioners 150 to change the appearances of the air conditioners 150, based on the operation settings acquired by the air conditioner data acquisition unit 134.

The air conditioner setting acquisition unit 335 specifies an appliance ID by sequentially controlling the air conditioners 150 via the air conditioner operation control unit 338 to check whether the image represented by the image data transmitted from the user terminal 210 indicates the content after the control. For example, the air conditioner setting acquisition unit 335 specifies an air conditioner 150 included in the image, in accordance with whether a change in operation setting designated by the air conditioner operation control unit 338 appears in the image captured by the image capturing unit 112. The air conditioner setting acquisition unit 335 acquires the operation settings of the air conditioner 150 corresponding to the specified appliance ID.

Figure 11:
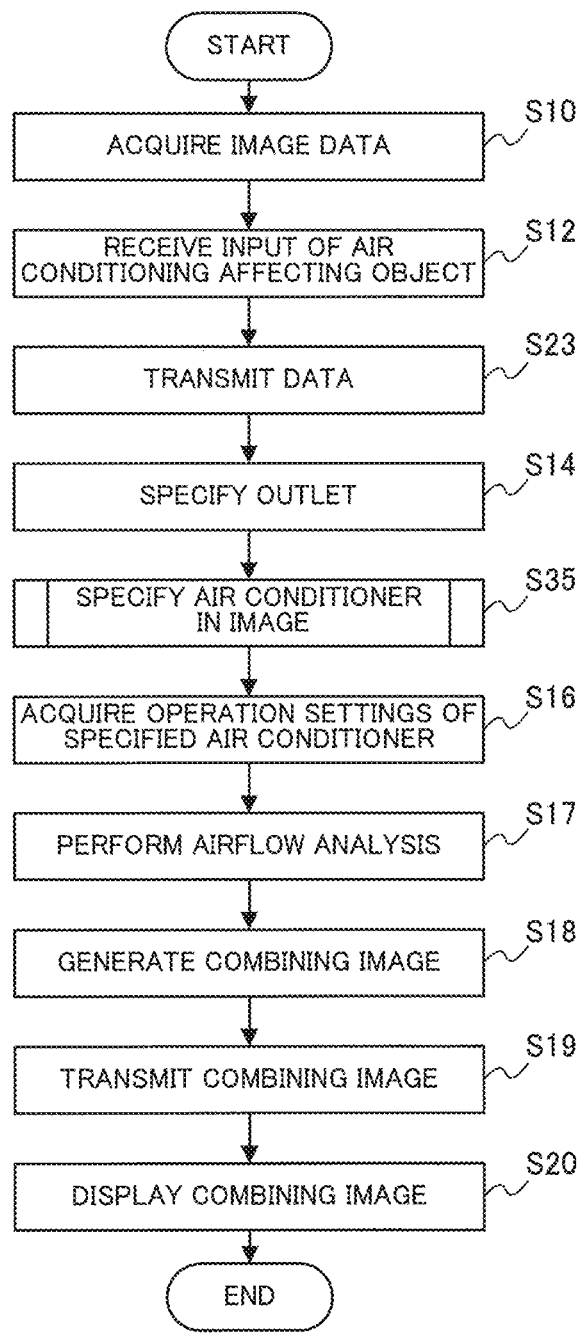
FIG. 11 is a flowchart illustrating the operation of the air conditioning visualization system according to Embodiment 3.

FIG. 11 is a flowchart illustrating the operation of the air conditioning visualization system 300 according to Embodiment 3.

The same reference numerals as in FIG. 9 denote steps for performing the same processes in FIG. 11, and a detailed description thereof will not be given.

The processes in steps S10 to S14 illustrated in FIG. 11 are the same as those in steps S10 to S14 illustrated in FIG. 9. After step S14 illustrated in FIG. 11, however, the process proceeds to step S35.

In step S35, the air conditioner setting acquisition unit 335 specifies an appliance ID, based on the image data transmitted from the user terminal 210. The process in step S35 will be described in detail with reference to FIG. 12. After the process in step S35, the process proceeds to step S16.

The processes in steps S16 to S20 of FIG. 11 are the same as those in steps S16 to S20 of FIG. 9.

Figure 12:
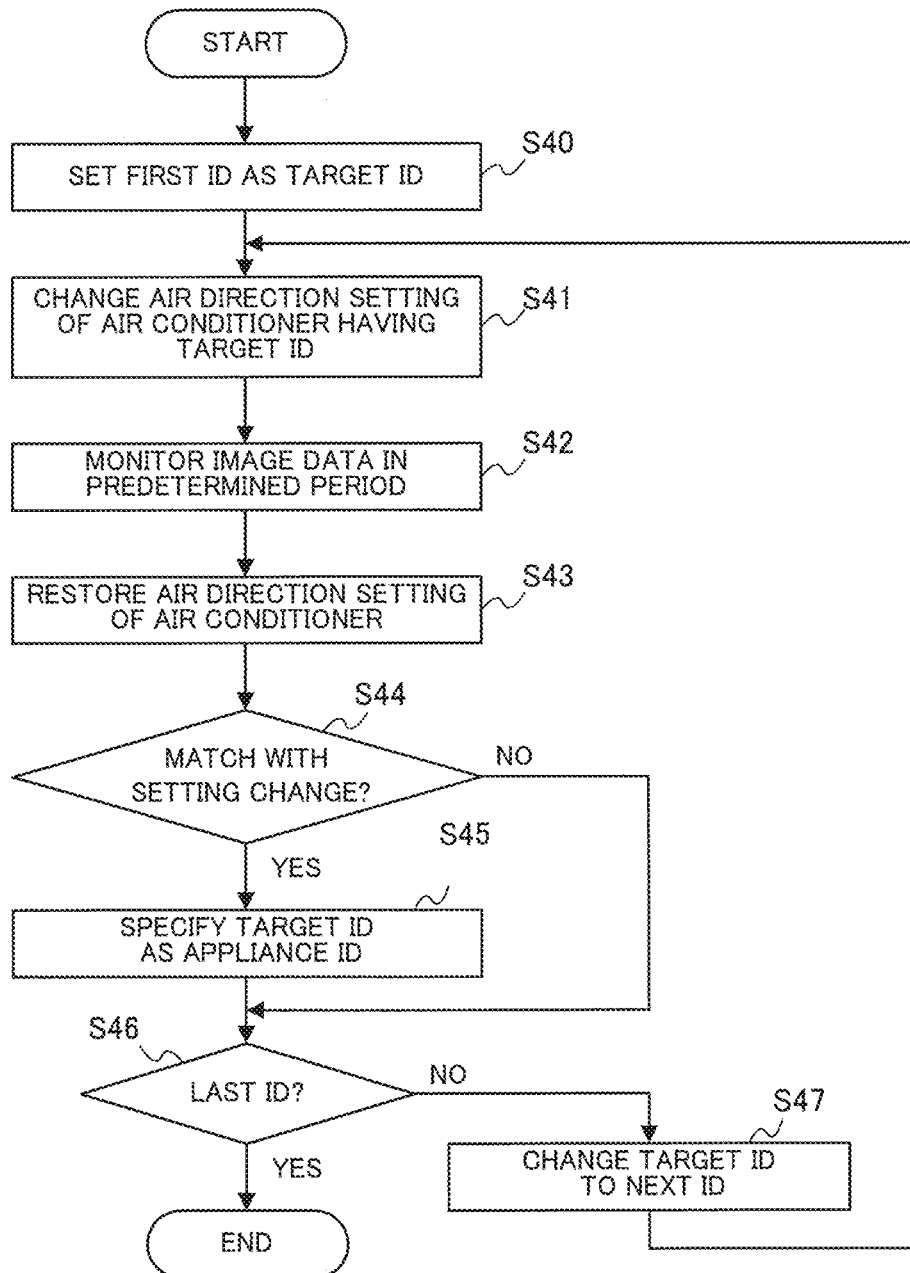
FIG. 12 is a flowchart illustrating processing for specifying an air conditioner in Embodiment 3.

FIG. 12 is a flowchart illustrating processing for specifying an air conditioner 150 in step S35 of FIG. 11.

Here it is assumed that appliance IDs are assigned to the plurality of air conditioners 150 in a sequential order.

First, the air conditioner setting acquisition unit 335 sets the first appliance ID of the air conditioner 150 as a target ID (S40).

The air conditioner setting acquisition unit 335 then acquires the air direction setting of the air conditioner 150 corresponding to the target ID via the air conditioner data acquisition unit 134, stores this setting in the storage unit not shown, and issues an instruction to change the current air direction setting of the air conditioner 150 corresponding to the target ID via the air conditioner operation control unit 338 (S41).

The air conditioner setting acquisition unit 335 monitors image data acquired from the image capturing unit 112, for a predetermined period (for example, one minute) required to change the air direction of the air conditioning system (S42).

The air conditioner setting acquisition unit 335 restores, via the air conditioner operation control unit 338, the air direction setting of the air conditioner 150 corresponding to the target ID to the air direction setting before the change stored in step S41 (S43).

The air conditioner setting acquisition unit 335 determines whether the change in the image represented by the image data matches the change in the air direction setting, based on the monitoring result obtained in step S42 (S44). If they match each other (YES in step S44), the process proceeds to step S45; if they do not match each other (NO in step S44), the process proceeds to step S46.

In step S45, the air conditioner setting acquisition unit 335 specifies the target ID as the appliance ID of the air conditioner 150 in the image. The process then proceeds to step S46.

In step S46, the air conditioner setting acquisition unit 335 determines whether the target ID has reached the last number of the appliance ID. If it has reached the last number (YES in step S46), the process ends; if it has not reached the last number (NO in step S46), the process proceeds to step S47.

In step S47, the air conditioner setting acquisition unit 335 changes the target ID to the next appliance ID. The process then returns to step S41.

With the air conditioning visualization system 300 according to Embodiment 3, it is possible to visualize the air conditioning system without presupposing an indoor position detection system, without performing initial settings such as drawing information for each building, and without adding any device to the air conditioner 150.

In above-described Embodiments 1 to 3, each of the air conditioner setting acquisition units 135 to 335 specifies the appliance ID of the air conditioner in the image by using an indoor position detecting system or the like, and acquires operation setting from the air conditioning system, but the processing of each of the air conditioner setting acquisition units 135 to 335 is not limited to such an example.

Figure 13:
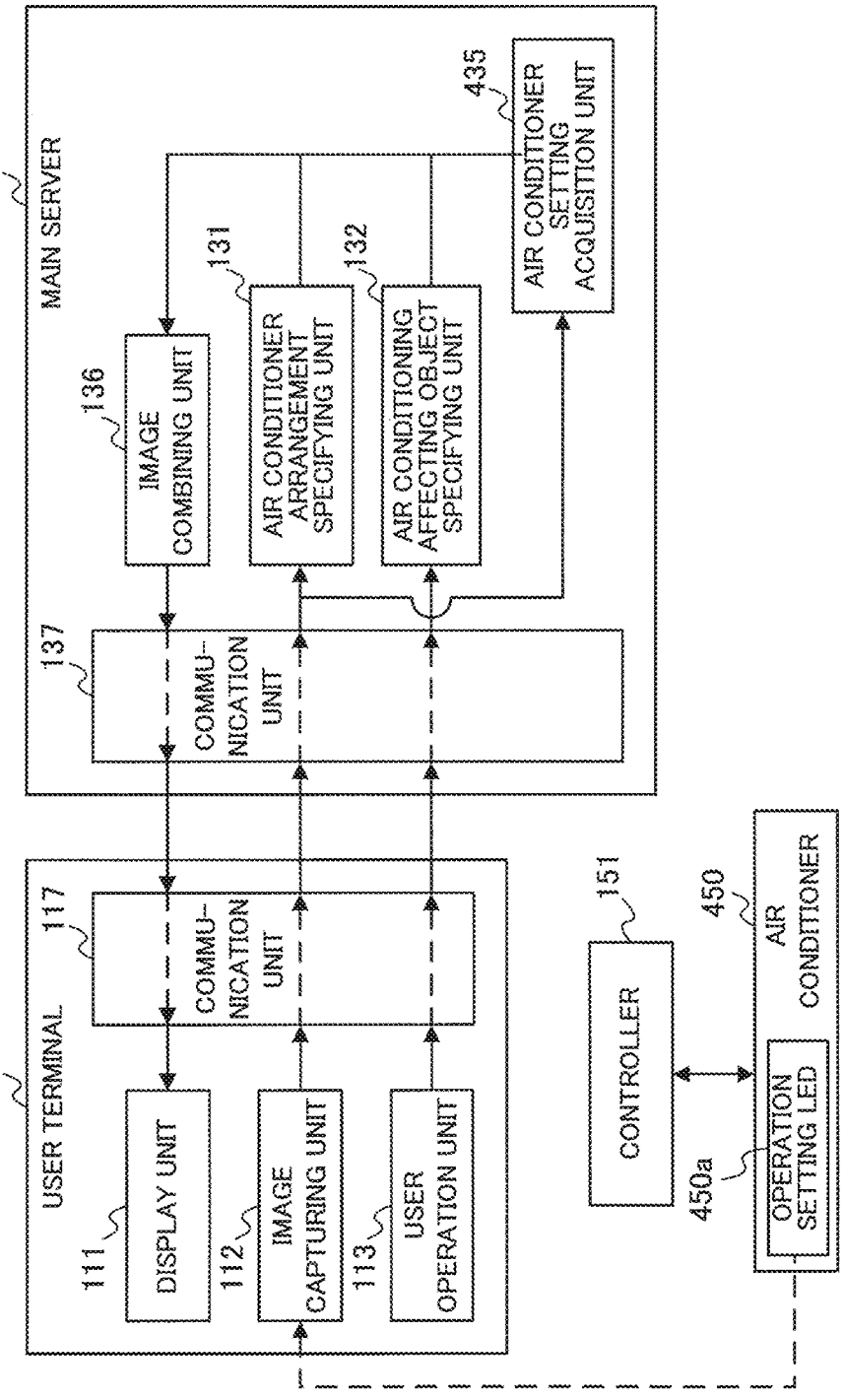
FIG. 13 is a block diagram schematically illustrating configurations of a user terminal and a main server in a Modification.

For example, as illustrated in FIG. 13, when an air conditioner 450 includes an operation setting LED 450a as an indicator which emits light in light emission patterns varying with the operation settings, an air conditioner setting acquisition unit 435 can acquire the operation setting from the light emission pattern. According to the processing, it is possible to visualize the air conditioning system without using an indoor position detection system and without preparing a means for communicating with the air conditioning system. Although FIG. 13 illustrates a user terminal 210 and a main server 430 based on Embodiment 2 or 3, such a Modification is also applicable to Embodiment 1.

According to the above-described embodiments, even when there are a plurality of air conditioners, as it is possible to specify an air conditioner exerting an influence on a space included within an image capturing range, the operation state of air conditioning in the space can be checked based on a visualization image.

In the above-described embodiments, as it is possible to specify the outlet of an air conditioner exerting an influence on a space included in an image captured by the image capturing unit from the image captured by the image capturing unit, airflow analysis can be easily performed.

As the influence of airstreams from a plurality of outlets can be analyzed, the influence that the air conditioner exerts on the space in the image can be more accurately checked.

In the above-described embodiments, as the position of an air conditioning affecting object affecting air conditioning by the air conditioner can be specified, airflows affected by the air conditioning affecting object can be checked.

When the plurality of air conditioners include indicators for identifying the individual air conditioners, the air conditioner in the image can be more accurately, easily specified.

As long as operation settings can be identified by the indicators, the operation setting of the target air conditioner can be acquired without communication with the air conditioning system.

In the above-described embodiments, the air conditioner in the image can be easily specified based on the image capturing range of the image captured by the image capturing unit, and air conditioner arrangement information indicating the positions where the plurality of air conditioners are placed.

Airflows or the like according to the operation settings of an air conditioner can be easily checked by acquiring the operation settings of the air conditioner via the controller for the air conditioner.

The air conditioner in the image can be easily specified by changing the operation settings of the plurality of air conditioners and checking whether this change is reflected on the image captured by the image capturing unit.

Apparent temperature perceived by the user can be easily checked, by virtually compositing an image captured by the image capturing unit with a distribution of temperature in the space in the image.

The user can easily check the influence of an air conditioner, by compositing an image captured by the image capturing unit with an image virtually representing the influence of the air conditioner.

What is claimed is:

1. An air conditioning visualization system comprising:
   a camera to capture an image;
   a plurality of processors, one of the processors specifying at least one air conditioner exerting an influence on a space included in the image from a plurality of air conditioners and acquiring operation settings of the at least one air conditioner; and
   a display to display a visualization image obtained by visualizing the influence exerted on the space by the at least one air conditioner, wherein
   one of the processors specifies the air conditioner included in the image captured by the camera as the air conditioner exerting the influence on the space;
   one of the processors specifies an outlet of the air conditioner included in the image captured by the camera;
   one of the processors specifies, in the image captured by the camera, a position of an air conditioning affecting object affecting air conditioning by the air conditioner included in the image captured by the camera;
   the influence on the space is an airstream affected by the air conditioning affecting object from the specified outlet; and
   the air conditioning affecting object is a heat source.

2. The air conditioning visualization system according to claim 1, wherein when the image captured by the camera includes a plurality of the outlets, the influence on the space is a combination of airstreams from the outlets.

3. The air conditioning visualization system according to claim 1, wherein
   the air conditioners include first indicators for identifying each of the air conditioners; and
   one of the processors specifies the air conditioner included in the image captured by the camera with the first indicator included in the image captured by the camera.

4. The air conditioning visualization system according to claim 1, wherein
   the air conditioners include second indicators for identifying the operation settings; and
   one of the processors acquires the operation settings of the air conditioner included in the image captured by the camera with the second indicator included in the image captured by the camera.

5. The air conditioning visualization system according to claim 1, wherein
   one of the processors specifies an image capturing range of the image captured by the camera;
   a memory stores air conditioner arrangement information indicating a position of each of the air conditioners; and
   one of the processors specifies an air conditioner included within the image capturing range as the air conditioner exerting the influence on the space, based on the air conditioner arrangement information.

6. The air conditioning visualization system according to claim 1, wherein
   a single one of the processors acquires the operation settings of each of the air conditioners via a controller for the air conditioners; and
   one of the processors except the single one of the processor instructs the single one of the processors to acquire the operation settings of the air conditioner exerting the influence on the space.

7. The air conditioning visualization system according to claim 1, wherein
   one of the processors acquires the operation setting of each of the plurality of air conditioners via a controller for the air conditioners;
   one of the processors instructs the controller to control the operation setting of each of the plurality of air conditioners; and
   one of the processors sequentially changes the operation settings of the air conditioners to make changes to appearances of the air conditioners, based on the operation settings acquired via the controller, and one of the processors specifies the air conditioner exerting the influence on the space included in the image, in accordance with whether one of the changes appears in the image captured by the camera.

8. The air conditioning visualization system according to claim 1, wherein the influence on the space is a temperature distribution of the space generated by the at least one air conditioner.

9. The air conditioning visualization system according to claim 1, wherein one of the processors generates the visualization image by combining an image virtually representing the influence exerted on the space by the at least one air conditioner with the image captured by the camera.

10. An air conditioning visualization system comprising:
    a camera to capture an image;
    a plurality of processors, one of the processors specifying at least one air conditioner exerting an influence on a space included in the image from a plurality of air conditioners and acquiring operation settings of the at least one air conditioner; and a display to display a visualization image obtained by visualizing the influence exerted on the space by the at least one air conditioner, wherein one of the processors specifies the air conditioner included in the image captured by the camera as the air conditioner exerting the influence on the space;

one of the processors specifies an outlet of the air conditioner included in the image captured by the camera;

one of the processors specifies, in the image captured by the camera, a position of an air conditioning affecting object affecting air conditioning by the air conditioner included in the image captured by the camera;

the influence on the space is an airstream affected by the air conditioning affecting object from the specified outlet; and the air conditioning affecting object is a shield.

* * * * *